H. S. BRITTON.
KITCHEN UTENSIL.
APPLICATION FILED FEB. 23, 1921.
1,427,439.
Patented Aug. 29, 1922.
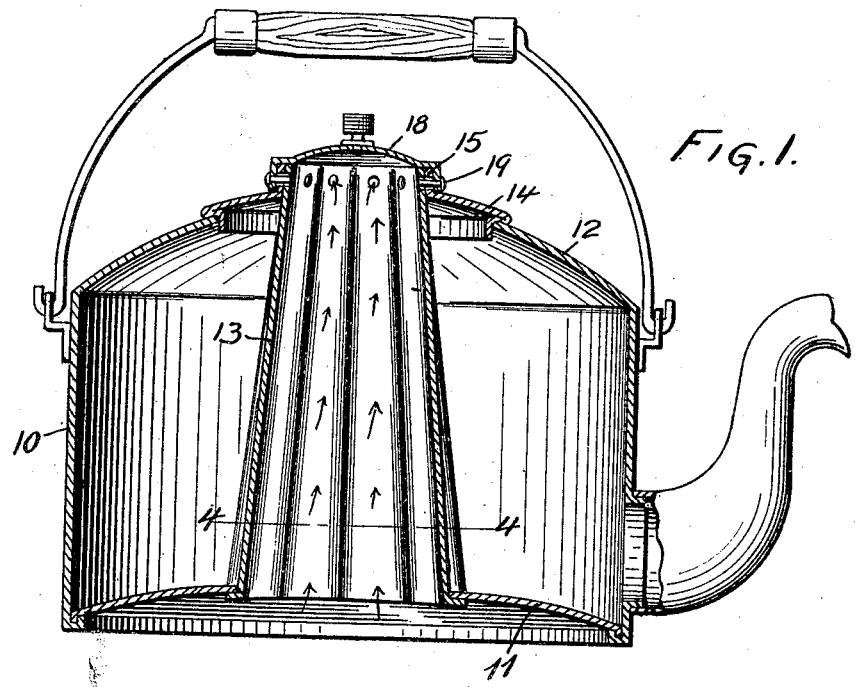
Fig. 1.
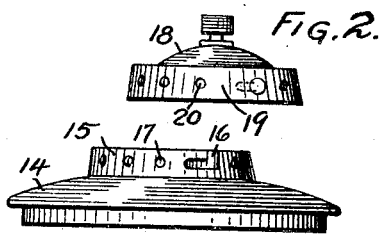
Fig. 2.
Fig. 3.
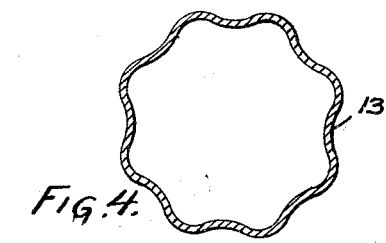
Fig. 4.
Inventor:
HELEN S. BRITTON
By Richard R. Owen.
atty.

UNITED STATES PATENT OFFICE.

HELEN SELINA BRITTON, OF CASTLETON HILL, NEW YORK.

KITCHEN UTENSIL.

1,427,439.  Specification of Letters Patent.  Patented Aug. 29, 1922.

Application filed February 23, 1921. Serial No. 447,036.

*To all whom it may concern:*

Be it known that I, HELEN S. BRITTON, a citizen of the United States, residing at Castleton Hill, in the county of Richmond and State of New York, have invented certain new and useful Improvements in Kitchen Utensils, of which the following is a specification.

This invention has relation to cooking utensils and has for an object to provide a combination utensil designed to be utilized as a kettle for heating water and also as a support for other cooking utensils whereby food may be cooked and water heated simultaneously, thus economizing in space where only one burner upon a stove is available.

In addition to the foregoing, this invention comprehends improvements in the details of construction and arrangement of parts to be hereinafter described and particularly pointed out in the appended claims.

In the accompanying drawings in which similar and corresponding parts are designated by the same reference numerals throughout the several views in which they appear:

Figure 1 is a view in vertical section of a cooking utensil constructed according to my invention.

Figure 2 is a view in side elevation of the flue cap.

Figure 3 is a view in side elevation of the closure.

Figure 4 is a transverse section taken on the line 4—4 of Figure 1.

With reference to the drawings 10 indicates an utensil in the nature of a water heating kettle having the upwardly curved bottom 11 and the dome shaped top portion 12. The bottom is apertured to receive the lower end of a tapering flue member 13 which is corrugated as shown. The upper end of the flue extends through an aperture in the top portion and a cover member 14 is provided which is seated within said aperture and is also formed with an opening through which the flue member extends. The aperture of the cover member is surrounded with an upstanding flange 15 which embraces the flue member, and said flange is formed with a pair of bayonet slots 16 and outlet perforations 17. A flue cap 18 is provided to embrace the flange 15 and carries pins 19 to enter the bayonet slots. Perforations 20 are formed in the sides of the cap to register with the perforations 17.

The parts just described are shown assembled in Figure 1 from which it will be noted that the heat may enter the flue 13 and pass upward effecting an exit through the registering perforations 17 and 20. The additional heating area afforded by the provision of the flue member will cause the water to heat more rapidly than if the bottom were the only portion of the kettle exposed to the heat.

Another utilitarian object of my invention is to economize space upon a cooking stove or range by causing one burner to heat more than one utensil at a time. Obviously economy in fuel will also ensue.

While I have illustrated and described my invention with some degree of particularity I realize that in practice various alterations therein may be made. I therefore reserve the right and privilege of changing the form of the details of construction or otherwise altering the arrangement of the parts, without departing from the spirit of the invention or the scope of the appended claims.

Having thus described my invention what I claim as new and desire to secure by Letters Patent is:

1. A kitchen utensil comprising a container having an opening in its bottom and top walls, a tapering flue having its walls vertically corrugated and its lower end secured to the bottom wall of the container in registration with the opening in said bottom wall, a closure for the opening in the top wall of said container, said closure having an opening to receive the upper end of said flue, said flue and edge of said closure having registering openings, a second closure mounted on said upper end of the flue for rotation thereon and having openings for registration with said first mentioned registering openings, and a pin and slot connection between the second closure and the flue to limit rotation of said second closure.

2. A kitchen utensil comprising a container having an opening in its bottom and top walls, a tapering flue having its walls vertically corrugated and its lower end secured to the bottom wall of the container in registration with the opening in said bottom wall, a closure for the opening in the top wall of said container, said closure having an opening to receive the upper end of said flue, a flange on said closure embracing the flue, said flue and flange having registering openings and a pair of bayonet slots, a second closure for the upper end of the flue and having a flange embracing the first mentioned flange and having openings in its flange to register with the first mentioned registering openings, and pins extending from the flange of said second closure to enter the bayonet slots and limit rotation of said second closure.

In testimony whereof I affix my signature in presence of two witnesses.

HELEN SELINA BRITTON. [L. S.]

Witnesses:
 ADA LOUISE CONE,
 ELLA MILDRED BUSH.